United States Patent [19]

Shinada

[11] Patent Number: 5,202,872
[45] Date of Patent: Apr. 13, 1993

[54] OPTICAL DISC PLAYER WITH SERVO SYSTEM GAIN CONTROLLED WITH HYSTERESIS BY VIBRATION SENSOR CIRCUIT

[75] Inventor: Akira Shinada, Kanagawa, Japan
[73] Assignee: Sony Corporation, Tokyo, Japan
[21] Appl. No.: 622,780
[22] Filed: Dec. 5, 1990
[30] Foreign Application Priority Data
   Dec. 7, 1989 [JP] Japan ................................. 1-318479
[51] Int. Cl.$^5$ ............................................. G11B 7/095
[52] U.S. Cl. .............................. 369/44.32; 369/44.35; 369/54
[58] Field of Search ............... 369/44.29, 44.32, 44.35, 369/44.36, 54, 58; 250/201.1, 201.5, 202

[56] References Cited

U.S. PATENT DOCUMENTS 4,614,863  9/1986  Sato .................................. 369/44.32
4,703,468 10/1987  Baba et al. ..................... 369/44.36 X
4,890,273 12/1989  Takeuchi et al. ................. 369/44.36

FOREIGN PATENT DOCUMENTS 0306715 3/1989 European Pat. Off. .
0313745 5/1989 European Pat. Off. .

Primary Examiner—W. R. Young
Attorney, Agent, or Firm—Lewis H. Eslinger; Jay H. Maioli

[57] ABSTRACT

An optical disc apparatus includes an optical pickup for reading recorded information on an optical disc, a servo controller for performing tracking servo control and/or focus servo control of the optical pickup in response to an output signal from the optical pickup, a vibration detector for detecting a vibration of the apparatus, and a control circuit for performing up and down control of a servo gain for the tracking servo and/or the focus servo of the optical pickup in response to an output signal from the vibration detector.

4 Claims, 3 Drawing Sheets

Fig. 4A
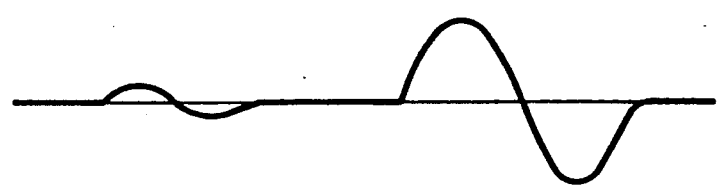
Fig. 4B
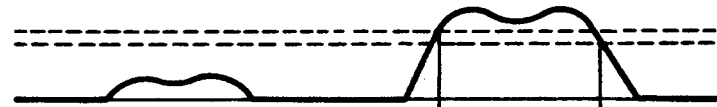
Fig. 4C
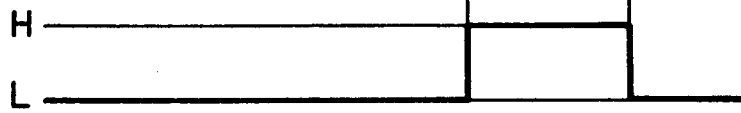
Fig. 4D
Fig. 5
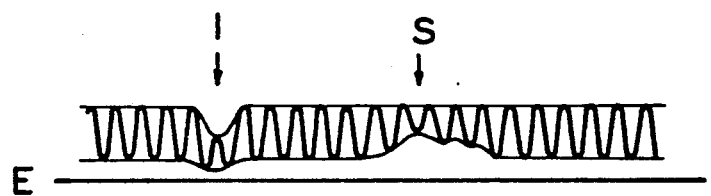

OPTICAL DISC PLAYER WITH SERVO SYSTEM GAIN CONTROLLED WITH HYSTERESIS BY VIBRATION SENSOR CIRCUIT

BACKGROUND OF THE INVENTION

1. Field of the Invention

This invention relates to a novel optical disc apparatus.

2. Description of the Prior Art

Optical disc apparatuses are provided with some countermeasure against flaws on discs, dust that adheres thereto or the like, as well as some countermeasure against vibrations or other mechanical external disturbances.

In a servo circuit concerning tracking controls and focus controls, in general, compromises involving opposite characteristics are known: an increase in the servo gain alleviates erroneous operations caused by vibrations but invites an excessive response against to disc flaws, dust, etc., which results in undesired movements of an optical pickup; and, in contrast, a decrease in the servo gain alleviates adverse influence from disc flaws but increases erroneous operations caused by vibrations.

In this connection, Japanese Patent Laid Open Publication No. Sho 60-74129, for example, discloses an apparatus which refers to a distortion in the waveform of an RF signal output from an optical pickup to decide whether the distortion has been caused by any disc flaw or dust, or by any vibration, thereby to decrease the servo gain in case of the former but increase the servo gain in case of the latter.

However, it is difficult to reliably decide from the RF signal waveform distortion the reason for the distortion because an RF signal distortion caused by disc flaws or dust may present an appearance as if it were caused by vibrations. This erroneous decision causes an increase of the servo gain, which is an adverse result opposite to the desired gain control (low gain). Therefore, it has been difficult to realize an apparatus less affected both by disc flaws or dust and by vibrations.

OBJECTS AND SUMMARY OF THE INVENTION

It is, therefore, an object of the invention to provide an optical disc apparatus less affected by disc flaws or dust and by vibrations of the apparatus, having less possibility of erroneous operations, and particularly suitable for a car-use optical disc apparatus.

According to an aspect of the invention, there is provided an optical disc apparatus comprising: an optical pickup for reading recorded information on an optical disc; servo control means for performing tracking servo control and/or focus servo control of the optical pickup in response to an output signal from the optical pickup; vibration detector means for detecting a vibration of the body of the apparatus; and control means for performing up and down control of a servo gain for the tracking servo and the focus servo of the optical pickup in response to an output signal from the vibration detector means.

BRIEF DESCRIPTION OF THE DRAWINGS

FIG. 4 consisting of FIGS. 4A, 4B, 4C and 4D, is a schematic waveform diagram; and FIG. 5 is a schematic eye pattern diagram of an RF signal.

DETAILED DESCRIPTION OF THE PREFERRED EMBODIMENTS

Figure 1:
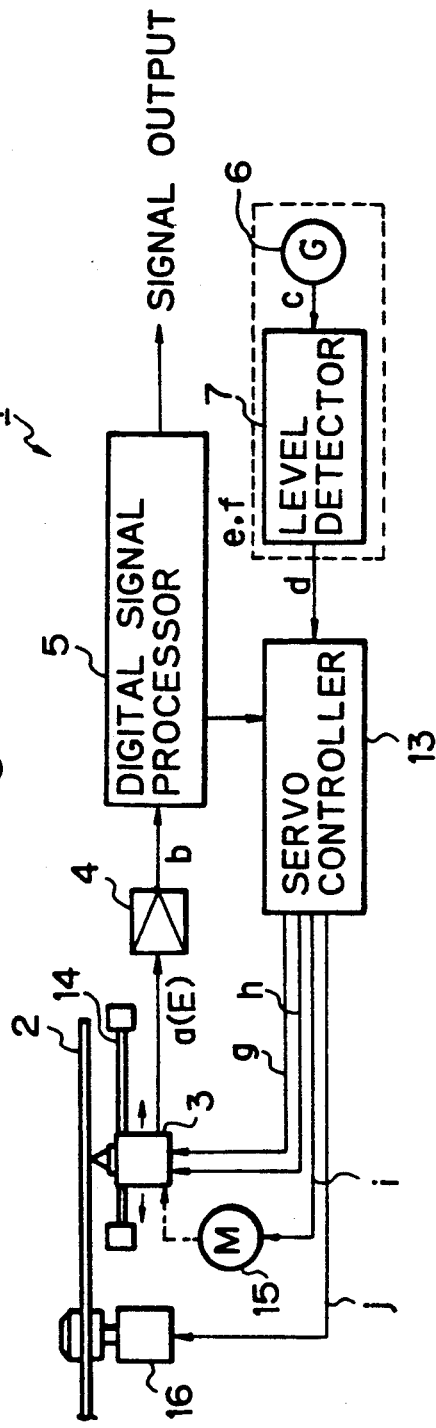
FIG. 1 is a block diagram showing the entire construction of an optical disc apparatus embodying the invention.

An optical disc apparatus according to the invention is described below in detail, referring to a preferred embodiment illustrated in the drawings. The illustrated embodiment is a compact disc player 1 incorporating the instant invention.

Figure 3:
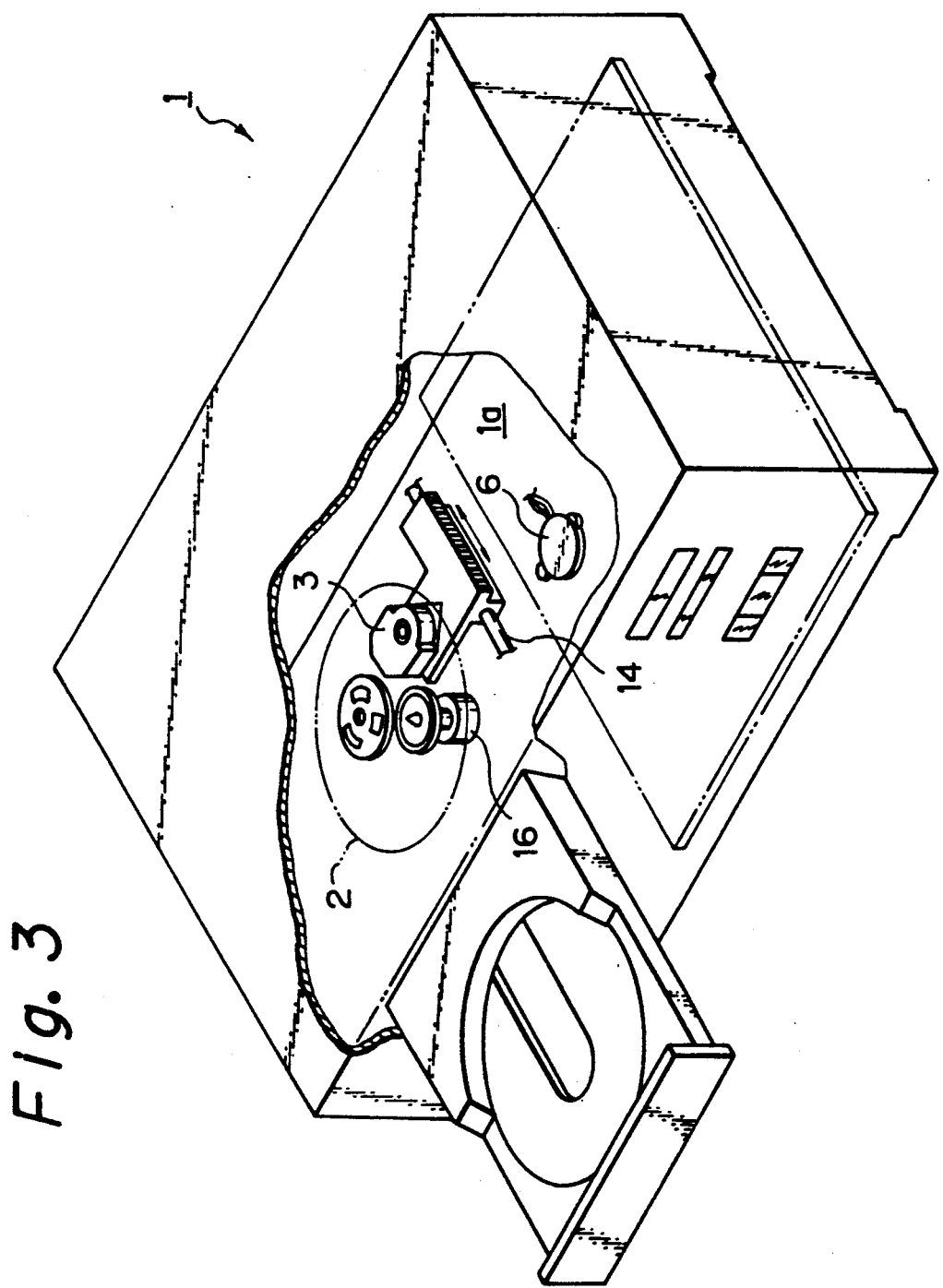
FIG. 3 is a schematic perspective view of the optical disc apparatus of FIG. 1 in which its housing is partly cut away to show part of its interior arrangement.

In FIGS. 1 and 3, reference numeral 2 denotes a disc. Numeral 3 refers to an optical pickup. When a laser beam irradiates to the disc 2, reflected light is received by a detector (not shown), and a signal a(E) indicative of the received light is formed into a signal b through an RF amplifier 4 and supplied to a digital signal processor 5.

Reference numeral 6 designates a vibration sensor which detects a vibration of the compact disc player 1 and produces an electrical detection signal c, and it may be of a type using an ultrasonic vibrator. The vibration sensor 6 is mounted on a bottom portion or plate 1a of the disc player 1, with its detecting portion in close contact with the bottom plate 1a, as shown in FIG. 3. The sensitivity of the vibration sensor 6 varies slightly, depending on the direction of the vibration of the compact disc player 1, i.e., vertical vibration or horizontal vibration. The difference, however, is small and can be disregarded.

Figure 2:
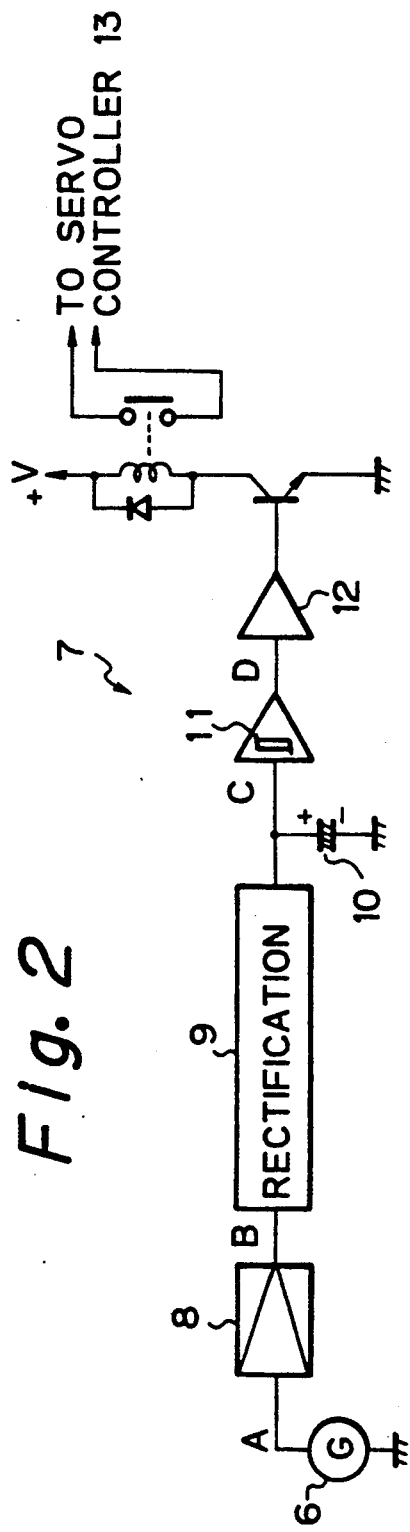
FIG. 2 is a circuit block diagram showing the main section of the optical disc apparatus of FIG. 1.

Reference numeral 7 denotes a level detector circuit which is provided for extracting the output signal c of the vibration sensor 6 in the form of a digitized signal d. As shown in FIG. 2, the level detector circuit 7 includes, for example, a rectifier circuit 9 connected to an amplifier 8 for amplifying a voltage generated by the vibration sensor 6 and obtains a DC voltage responsive to the vibration. In this case, if the vibration sensor 6 and the amplifier 8 have flat frequency characteristics in a desired range, a DC voltage independent of the vibration frequency can be obtained. The output after rectification may be digitized through a smoothing capacitor 10, a hysteresis comparator 11 and a buffer 12. The digitized output is supplied through a transistor and a relay to a servo controller 13 referred to later as a signal d. More specifically, an H (high) signal is obtained when a vibration above a first predetermined level is detected, and an L (low) signal is obtained otherwise or, as FIGS. 4C and 4D show, when the level of the vibration falls below a second predetermined level lower than the first level. Since the magnitude of the obtained DC voltage varies with gain of the amplifier 8, the reference level (threshold value) for comparison and decision can be set at a desired value by changing the gain of the amplifier 8. Additionally, by selecting the capacitance of the smoothing capacitor 10, the output time of the H signal, i.e., the time in which a constant status is held, can be set at a desired value.

Reference numeral 13 denotes a servo controller which performs focus servo control for holding an objective lens provided in the optical pickup 3 at a predetermined distant position from the disc, surface, and performs tracking servo control for ensuring that the optical pickup 3 precisely traces a track of the disc 2.

The servo controller 13, in response to a tracking error signal e and a focus error signal f from the digital signal processor 5, supplies predetermined control signals g and h to a tracking coil and a focusing coil in the optical pickup 3 to perform servo control thereof. In this occasion, the servo controller 13 also controls the response characteristic of the servo system by varying the servo gain of the servo controller 13 up and down in response to the digitized signal from the level detector circuit 7. For example, when the signal d from the level detector circuit 7 is the L signal, the servo gain is set to be 0 dB in the frequency range of 1 to 2 kHz. When the signal d from the level detector circuit 7 goes to the H signal, the servo gain is increased by 6 dB as long as the H signal continues. The servo gain need not be increased by 6 dB at once when the servo controller 13 receives the H signal from the level detector circuit 7, but it may be increased stepwise by 1 to 2 dB for every predetermined period of time to finally reach the total variation (6 dB).

Also when the servo gain is returned to the original value after removal of a vibration, it may be decreased stepwise.

Reference numeral 14 refers to a guide shaft, 15 to a thread-moving motor for moving the entire optical pickup 3 along the guide shaft 15 in the radial direction of the disc, and 16 to a spindle motor for rotating the disc. These motors 15 and 16 are controlled by signals i and j from the servo controller 13.

The operation of the compact disc player 1 described above is described below. It is noted that FIG. 4 shows, merely schematically, signal waveforms at various portions of the level detector circuit 7. FIG. 4A refers to the waveform of the output signal of the vibration sensor 6, FIG. 4B to the waveform of output signal of the amplifier 8, FIG. 4C to the waveform as rectified and smoothed (a broken line indicates the threshold value), and FIG. 4D refers to the waveform of the output signal from the hysteresis comparator 11. The waveform which is schematically shown in FIG. 5 represents the RF signal E detected by the optical pickup 3.

As long as a vibration of the compact disc player 1 is small, the output of the hysteresis comparator 11 of the level detector circuit 7 is held in the L level, and the servo controller 13 sets the servo gain for tracking servo and focus servo at a low value.

Therefore, when the disc 2 has a flaw or dust attached thereto, the RF signal E output from the optical pickup 3 temporarily goes to a low level as shown by an arrow I in FIG. 5, for example. However, since the servo gain is set low, the response of the servo system to the error signal is low thereby preventing a tracking deviation or the like.

When any external disturbance vibration occurs to the apparatus and it is detected by the vibration sensor 6 and the level detector circuit 7, the output of the hysteresis comparator 11 becomes the H signal, and the servo controller 13 increases the servo gain for a period of time during which the H signal continues.

The RF signal E at this time represents a waveform as shown by an arrow S in FIG. 5, for example, in which the modulation level is small. However, since the servo gain is set high, the response of the servo system is increased. As a result, the servo system represents a sufficiently sensitive response to the vibration as well, and ensures that a laser beam by the optical pickup 3 follows a recording track on the disc 2.

In the compact disc player 1 referred to above, the vibration sensor 6 detects a vibration of the apparatus, and the value of the servo gain is varied in response to the digitized signal which is fed from the level detector circuit 7 to the servo controller 13.

In other words, the servo gain is held in a low value as long as the vibration is small so that the apparatus is less affected by a flaw or dust on the disc, and only when a large vibration is detected by the vibration sensor 6, the servo gain is increased to improve the tracing property of the servo system.

As a result, even if the RF signal has the waveform shown by an arrow S in FIG. 5, caused by a flaw or dust on the disc 2, erroneous operation such as an erroneous increase of the servo gain never occurs. Thus, a stable gain control can be realized and a playback performance can be improved.

The embodiment described above is a mere example of the invention. The invention may be adapted to any one of various kinds of optical reading apparatuses such as laser disc apparatus, magneto-optical disc apparatus and others. Further, the servo gain control method may be any one of various kinds of methods not limited to the described embodiment.

What is claimed is:

1. An optical disc apparatus comprising:
   an optical pickup for reading recorded information on an optical disc and producing an information output signal corresponding thereto;
   servo control means for performing tracking servo control and/or focus servo control of said optical pickup in response to said information output signal;
   vibration sensor means for sensing a vibration of said apparatus and producing a vibration output signal having a level that varies in response to a sensed vibration level; and
   control means for controlling a servo gain for the tracking servo and/or the focus servo of said optical pickup in response to said vibration output signal from said vibration sensor means and including a hysteresis comparator means receiving said vibration output signal for producing a control signal having a high level for increasing said servo gain when said vibration output signal is above a first predetermined threshold level and for producing said control signal having a low level for decreasing said servo gain when said vibration output signal is below a second predetermined threshold level, lower than said first threshold level.

2. The optical disc apparatus according to claim 1 wherein said control means increases or decreases said servo gain in stepwise fashion by a predetermined amount at predetermined time intervals.

3. The optical disc apparatus according to claim 1 wherein said control means includes a level detector circuit for converting said vibration output signal from said vibration sensor means into a digitized signal and for supplying the digitized signal as said vibration output signal to said hysteresis comparator means.

4. The optical disc apparatus according to claim 1 wherein said vibration sensor is attached to a bottom portion of said apparatus.

* * * * *